United States Patent
Wallace

[11] Patent Number: 5,962,830
[45] Date of Patent: Oct. 5, 1999

[54] SELF SERVICE TERMINAL

[75] Inventor: David W. Wallace, Fife, United Kingdom

[73] Assignee: NCR Corporation, Dayton, Ohio

[21] Appl. No.: 08/893,341

[22] Filed: Jul. 16, 1997

[30] Foreign Application Priority Data

Dec. 24, 1996 [GB] United Kingdom .................. 9626836

[51] Int. Cl.⁶ .................................................. G06F 17/60
[52] U.S. Cl. .......................................... 235/379; 235/380
[58] Field of Search .................................. 235/380, 375, 235/379, 382

[56] References Cited

U.S. PATENT DOCUMENTS

| | | | |
|---|---|---|---|
| 4,454,414 | 6/1984 | Benton | 235/379 |
| 5,310,999 | 5/1994 | Claus et al. | 235/384 |
| 5,485,520 | 1/1996 | Chaum et al. | 380/24 |
| 5,640,156 | 6/1997 | Okuda et al. | 340/928 |
| 5,661,286 | 8/1997 | Fujioka | 235/382 |
| 5,663,548 | 9/1997 | Hayashi et al. | 235/384 |
| 5,819,234 | 10/1998 | Slavin | 705/13 |
| 5,831,547 | 11/1998 | Ohtsuki et al. | 340/825.54 |

*Primary Examiner*—Thien Minh Le

[57] ABSTRACT

A self service terminal (10) has a central processing unit (CPU) (12) connected to a keyboard (20) on which images can be displayed. The keyboard comprises a plurality of separate, individually operable keys whose user engagable surfaces are arranged in a two-dimensional array. Each key incorporates a liquid crystal display (LCD) (24) where the image displayed by each LCD is changeable and under the control of the CPU. The keyboard is used to display text, characters or other images to the user of the self service terminal. Thus, no separate display is required. The keyboard serves also as a data entry device.

6 Claims, 4 Drawing Sheets

SELF SERVICE TERMINAL

BACKGROUND OF THE INVENTION

The present invention relates to a self service terminal, such as an automated teller machine (ATM).

At present self service terminals often comprise two separate interfaces: a data entry keyboard and a display screen for displaying instructions or information to a user. The keyboard has a fixed number of keys with the character or characters that each key represents printed on them. Thus, keyboards are manufactured to a specified layout and if a different keyboard layout is required then there would have to be changes in the manufacturing process. Also a disabled person may have difficulty in operating such a terminal, particularly if such a person is visually impaired or has limited use of upper limbs.

It is known that each key of a keyboard can comprise a light emitting diode (LED) or a liquid crystal display (LCD) mounted on its top face whereby the character displayed can be varied. For example, a letter on a key may be changed from upper case to lower case.

It is also known for self service terminals to employ touch screens in which areas on the screen act as keys if they are touched. However, some users find it difficult to key in information on a touch screen since the user does not get a positive tactile response.

SUMMARY OF THE INVENTION

It is an object of this invention to provide a self service terminal having improved user interface means for alleviating the problems referred to above.

According to the present invention there is provided a self service terminal including a central processing unit (CPU) connected to a keyboard incorporating a plurality of separate, individually operable keys whose user engagable surfaces are arranged in a two-dimensional array, each key incorporating an LCD, characterized by the image displayed by each LCD being changeable under the control of said CPU, whereby said keyboard also serves as a display means for the terminal.

BRIEF DESCRIPTION OF THE DRAWINGS

One embodiment of the invention will now be described by way of example with reference to the accompanying drawings in which.

DETAILED DESCRIPTION

Figure 1:
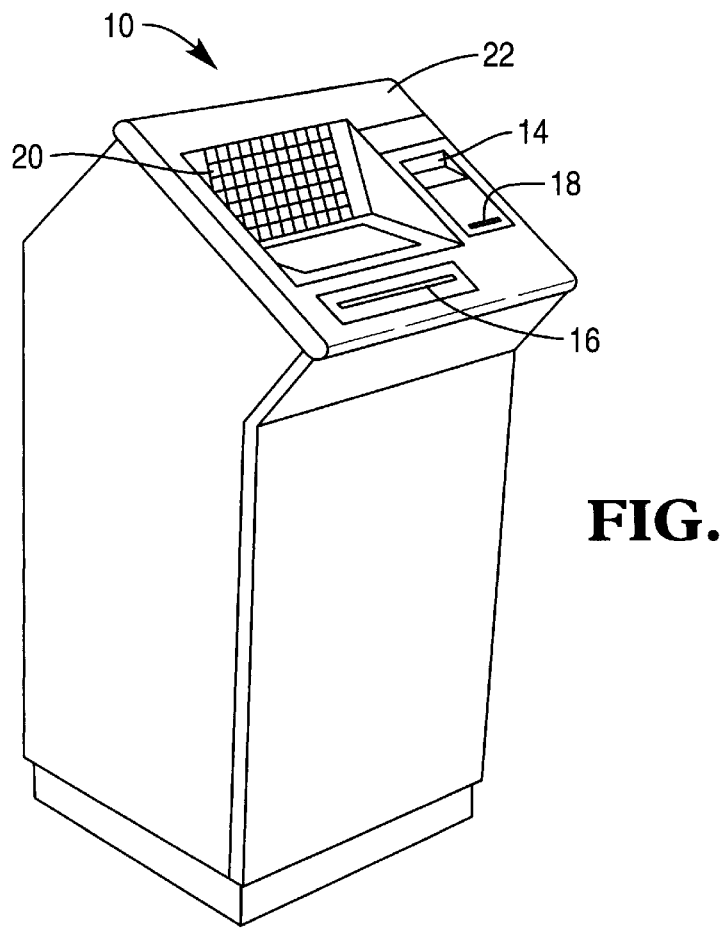
FIG. 1 is a perspective view of an ATM adapted to be in accordance with the invention.
Figure 2:
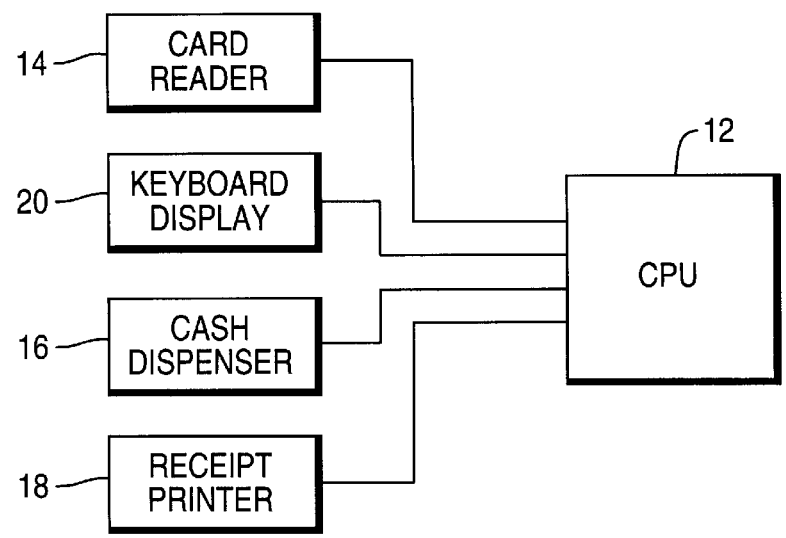
FIG. 2 is a block diagram representation of the ATM of FIG. 1.

Referring to FIGS. 1 and 2, there is shown therein an ATM 10 having a CPU 12 connected to a conventional card reader 14, cash dispenser 16 and receipt printer 18, and to a keyboard 20 in accordance with the invention which, as will be described in more detail later, serves both as a data entry means and as a display means for displaying instructions and information to a user of the terminal.

The module comprising the card reader 14, the cash dispenser 16 and the receipt printer 18 are respectively associated with slots which are provided in a front panel 22 of the ATM 10 and which in FIG. 1 have the same reference numerals as the respective modules. Thus, the card reader 14 has a card slot through which a user can insert a user's identifying card at the commencement of a transaction to be conducted by the user. The cash dispenser 16 has a cash slot through which currency notes stored inside the dispenser 16 can be delivered to the user during the transaction. The printer 18 has a slot through which an account statement may be delivered to the user or through which a receipt in respect of the transaction is delivered to the user at the termination of the transaction.

Figure 3:
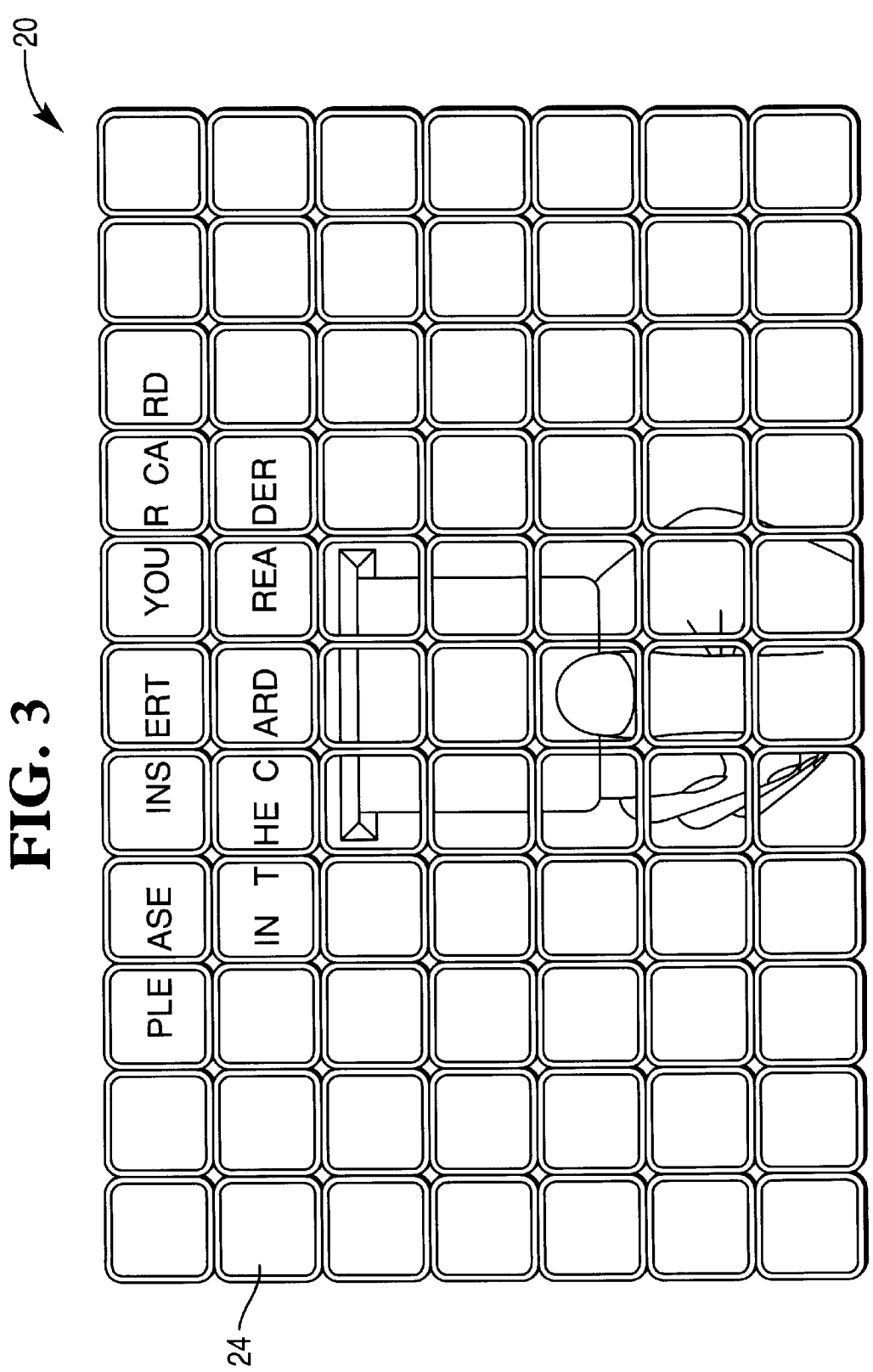
FIGS. 3 to 5 are views of the keyboard at the ATM showing typical displays which are provided by the keyboard at different stages of an ATM transaction.
Figure 4:
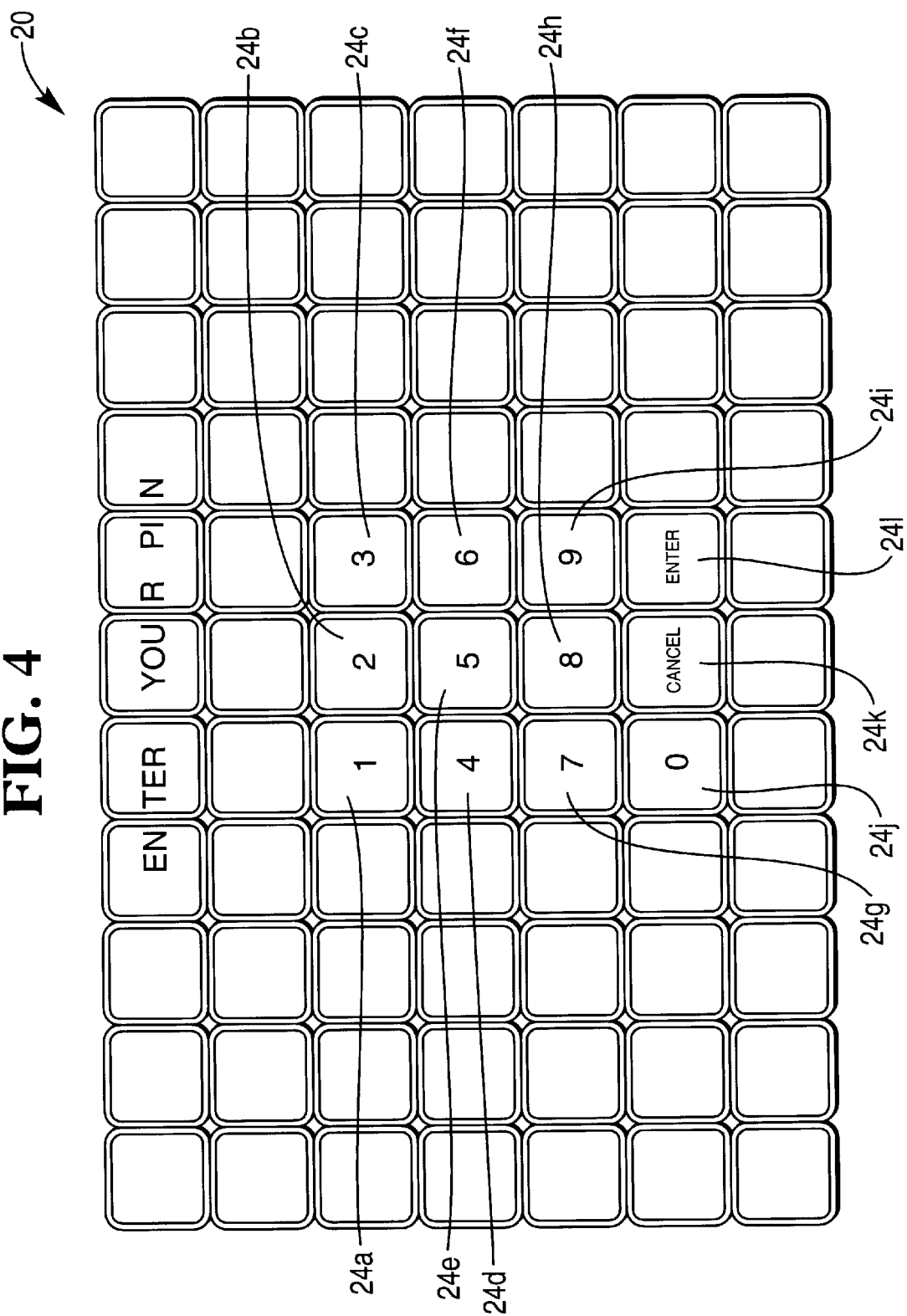
Figure 5:
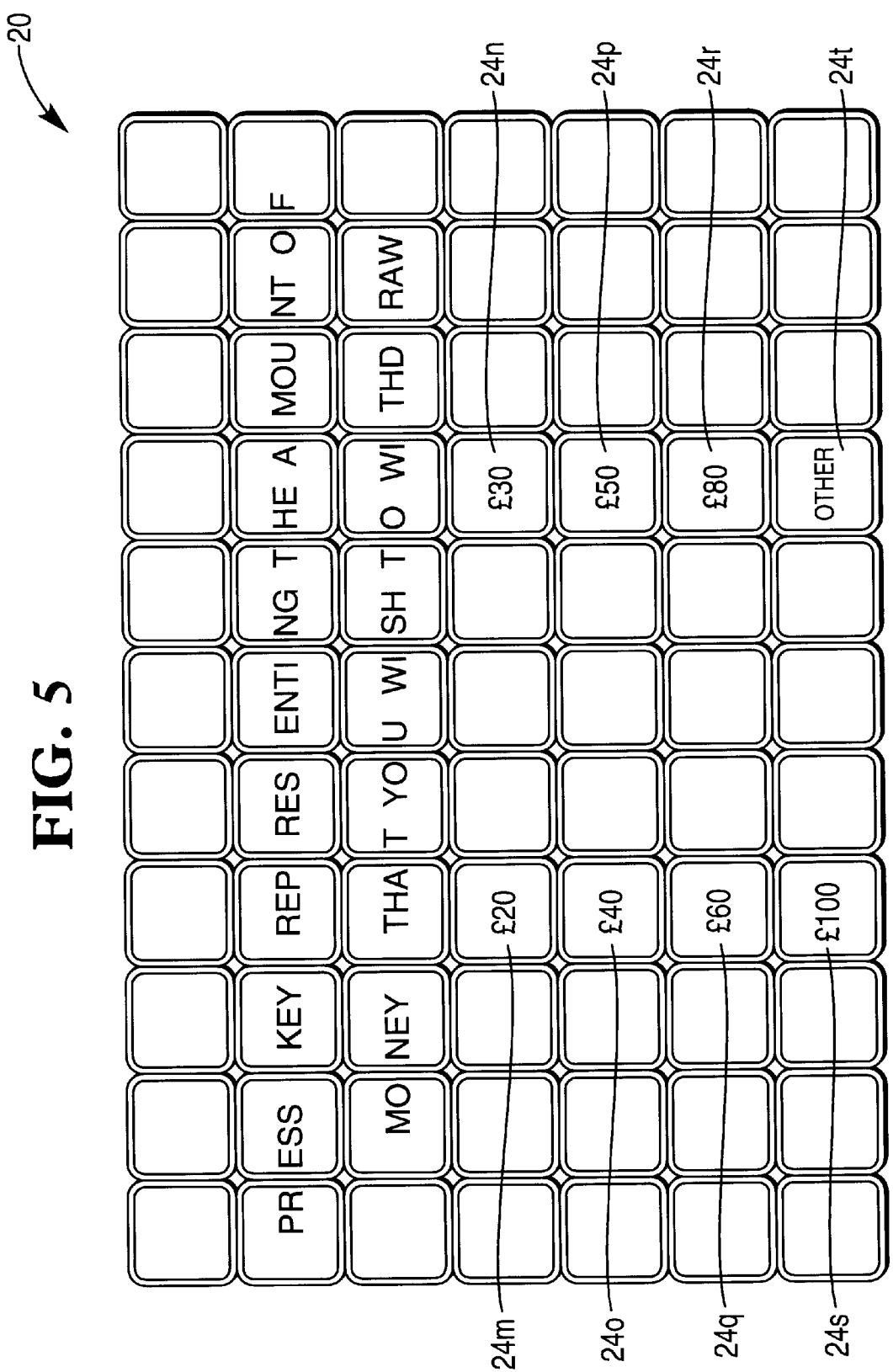

Turning now to FIGS. 3 to 5, the keyboard 20 comprises a plurality of separate individually operable user engagable surfaces 24 arranged in a two-dimensional array. Any selected user engagable surface 24 can be operated in a conventional manner by pressing it down. In the particular embodiment described, the keyboard 20 comprises an array of seventy-seven (11 by 7) individual user engagable surfaces 24, but it should be understood that if desired a different number of user engagable surfaces 24 could be provided. Each user engagable surface 24 is formed by an LCD, the image displayed by the LCD being controlled by the CPU 12. These LCDs are used to display text, characters, or other images to a user of the ATM 10. Thus, no separate display means such as a monitor is required.

The LCD forming each user engagable surface 24 can display a single character. It can also display part of an overall image where this image is displayed across a plurality of user engagable surfaces 24 with the CPU coordinating what is shown by adjoining user engagable surfaces 24. The image may, for example, be a picture, some text or a combination of both.

FIG. 3 shows the display on keyboard 20 at the commencement of an ATM transaction. Thus, the keyboard 20 displays instructions to the user to insert his bankers card into the card reader 14. Note that the top two rows of user engagable surfaces 24 display a text instruction, whereas the LCDs of the rest of the user engagable surfaces 24 are coordinated to display an image of a card being inserted into the card slot of the card reader 14 by a human hand.

Even though the edges of the user engagable surfaces 24 are not contiguous, but spaced, the image is sufficiently coordinated to be clear.

Next, as shown in FIG. 4, instructions appear on the keyboard 20 display for the user to enter his or her personal identity number (PIN). At the same time, twelve of the user engagable surfaces 24 not involved in displaying instructions now appear as a conventional data entry keyboard, these user engagable surfaces 24a–l respectively displaying the digits 1 to 0 and CANCEL and ENTER. Note, for example, that user engagable surface 24d displays the number "4". Thus, if user engagable surface 24d is pressed the CPU 12 records that the number "4" has been entered as part of the PIN.

The twelve user engagable surfaces 24a–l which appear as a conventional data entry keyboard are highlighted to indicate that they can be pressed. This highlighting is done by making them visually different from the rest of the user engagable surfaces, especially those which are displaying text or an image. For example, the background color of these twelve user engagable surfaces 24a–l may be white whereas the background color of the rest of the user engagable surfaces may be black. Thus, it is obvious to the user which user engagable surfaces he can press in order to indicate his response to instructions displayed where in this case his response is to key in his PIN.

Thus, it can be seen that if a user engagable surface 24*d* highlighted to be pressed is pressed, the CPU 12 will perform a function associated with the image displayed. It is also possible for the same user engagable surface 24*d* to be subsequently highlighted to be pressed with a different image displayed, so that if this same user engagable surface 24*d* is pressed the CPU 12 will now perform a different function.

After the correct PIN is entered, menus are displayed by the keyboard 20 to enable the user to carry out a desired transaction. A transaction may comprise one or more ATM services such as the dispensing of cash to the user by the dispenser 16 (see FIGS. 1 and 2), or the provision of an account statement or the display of the user's account balance.

FIG. 5 illustrates the display which may appear on the keyboard 20 when a user requires cash to be dispensed. Note that the user engagable surfaces 24*m–t* act as the equivalent of conventional ATM function keys. When one of the user engagable surfaces 24*m–t* is pressed the appropriate function is performed by the CPU 12 which in this case is to implement the process of dispensing the amount of cash displayed on that key.

The user operated terminal in accordance with the invention as described has a number of advantages.

Firstly, the keyboard 20 is of a tactile type whereby a user gets a positive tactile response from every keystroke made. This is an advantage over touch screens where a user does not get a positive tactile response.

Also, as mentioned previously, conventional self service terminals normally have two interfaces: a data entry keyboard and a display screen. Disabled people who are visually impaired or with limited use of their upper limbs have difficulty in interacting between the two interfaces. Having a keyboard that also acts as a display screen provides a single surface for the disabled user to interact with, thereby reducing the amount of hand to eye coordination required by a disabled user.

However, since a separate display means such as a monitor is no longer needed, less space is required by a terminal, in accordance with the invention.

Since the image displayed on each user engagable surface 24 is controlled by the CPU 12, it is possible to display characters and text of different languages on the keyboard 20 by programming the CPU 12 accordingly.

The keyboard 20 can be manufactured with a fixed number of keys. The displayed layout of the keyboard 20 can be varied to suit different customers by programming the CPU 12 accordingly without the need to change the physical number or type of keys. This simplifies the manufacturing process and reduce the cost of manufacture. Once in use, the keyboard 20 can have its displayed layout changed by the CPU 12.

What I claim is:

1. A self service terminal comprising:

a keyboard including a plurality of separate, individually operable keys having user engageable surfaces which are arranged in a two-dimensional array;

each key including a liquid crystal display (LCD) which cooperates with the LCDs of the other keys to provide a display for the terminal; and a central processing unit (CPU) connected to the keyboard and for controlling each LCD to control an image displayed by the respective LCD.

2. A terminal according to claim 1, wherein each of a plurality of adjoining keys displays on its LCD part of an overall image, the CPU coordinating the parts to provide the overall image.

3. A terminal according to claim 1, wherein each key displays on its LCD a separate image, the images of the keys together forming one of a plurality of keyboard layouts, the keyboard layout displayed being selectable by the CPU.

4. A terminal according to claim 1, wherein each of a plurality of adjoining keys displays on its LCD part of a full text message, the CPU coordinating the parts to provide the full text message.

5. A terminal according to claim 1, wherein (i) the function performed by the CPU if a key is pressed, and (ii) the image displayed on the LCD of that key can both be changed.

6. A terminal according to claim 1, wherein the keyboard is of a tactile type to provide a user with a positive tactile response from each keystroke made.

* * * * *